United States Patent
Saito et al.

(10) Patent No.: US 11,642,841 B2
(45) Date of Patent: May 9, 2023

(54) INDIRECT ADDITIVE MANUFACTURING PROCESS

(71) Applicant: UT-Battelle, LLC, Oak Ridge, TN (US)

(72) Inventors: Tomonori Saito, Knoxville, TN (US); Amy M. Elliott, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 377 days.

(21) Appl. No.: 15/783,574

(22) Filed: Oct. 13, 2017

(65) Prior Publication Data

US 2019/0111618 A1 Apr. 18, 2019

(51) Int. Cl.
*B29C 64/165* (2017.01)
*B29C 64/30* (2017.01)
(Continued)

(52) U.S. Cl.
CPC .......... *B29C 64/165* (2017.08); *B22F 10/14* (2021.01); *B28B 1/001* (2013.01); *B29C 64/30* (2017.08); *B33Y 10/00* (2014.12); *B33Y 40/00* (2014.12); *B33Y 70/10* (2020.01); *C08F 122/1006* (2020.02); *C08F 122/20* (2013.01); *C08K 3/10* (2013.01); *B22F 2998/10* (2013.01);
(Continued)

(58) Field of Classification Search
CPC ....... B29C 64/165; B29C 64/30; B33Y 10/00; B33Y 40/00; B33Y 70/00; B22F 3/008; B28B 1/001; C08F 122/20; C08K 3/10
See application file for complete search history.

(56) References Cited

U.S. PATENT DOCUMENTS

| 5,490,882 | A | | 2/1996 | Sachs et al. |
| 6,036,777 | A | * | 3/2000 | Sachs ............ B05C 19/04 118/56 |

(Continued)

FOREIGN PATENT DOCUMENTS

CN 105753361 * 2/2016 ............. C04B 24/02

OTHER PUBLICATIONS

CN-105,753,361 (Gao) Feb. 2016 (online machine translation), [Retrieved on Sep. 15, 2019]. Retrieved from: https://patents.google.com/ (Year: 2016).*

(Continued)

*Primary Examiner* — Alison L Hindenlang
*Assistant Examiner* — Andrés E. Behrens, Jr.
(74) *Attorney, Agent, or Firm* — Scully, Scott, Murphy & Presser, P.C.

(57) ABSTRACT

A method for indirect additive manufacturing of an object, the method comprising: (i) separately feeding a powder from which said object is to be manufactured and either a difunctional curable monomer according to Formula (I) or an adhesive polymer binder into an additive manufacturing device; (ii) dispensing selectively positioned droplets of said difunctional curable monomer or adhesive polymer binder, from a printhead of said additive manufacturing device, into a bed of said powder to bind particles of said powder with said difunctional curable monomer or adhesive polymer binder to produce a curable preform having a shape of the object to be manufactured; and, in the case of the difunctional curable monomer, (iii) curing said curable preform to form a crosslinked object.

14 Claims, 2 Drawing Sheets

(51) Int. Cl.

| | | |
|---|---|---|
| C08F 122/20 | (2006.01) | |
| B33Y 40/00 | (2020.01) | |
| C08K 3/10 | (2018.01) | |
| B33Y 10/00 | (2015.01) | |
| B22F 10/10 | (2021.01) | |
| B33Y 70/10 | (2020.01) | |
| C08K 3/08 | (2006.01) | |
| C08K 3/22 | (2006.01) | |
| B28B 1/00 | (2006.01) | |
| C08F 122/10 | (2006.01) | |
| B22F 10/14 | (2021.01) | |
| C22C 33/02 | (2006.01) | |

(52) U.S. Cl.
CPC ............... $C08K\ 3/08$ (2013.01); $C08K\ 3/22$ (2013.01); $C22C\ 33/0207$ (2013.01)

(56) References Cited

U.S. PATENT DOCUMENTS

| | | |
|---|---|---|
| 7,287,587 B2 | 10/2007 | Reddy et al. |
| 8,465,777 B2 | 6/2013 | Wang et al. |
| 10,040,216 B2 | 8/2018 | Bai et al. |
| 2002/0125592 A1* | 9/2002 | Schulman ............. A61K 6/802 264/16 |
| 2005/0003189 A1* | 1/2005 | Bredt .................... B29C 64/165 428/402 |
| 2006/0270748 A1* | 11/2006 | Sommerlade .......... C07C 45/46 522/6 |
| 2015/0069649 A1 | 3/2015 | Bai et al. |
| 2016/0083589 A1 | 3/2016 | Ganapathiappan et al. |
| 2016/0332367 A1 | 11/2016 | Sun et al. |
| 2017/0203514 A1 | 7/2017 | McCoy et al. |
| 2017/0260418 A1* | 9/2017 | Wu ........................ C09D 11/10 |
| 2018/0236544 A1 | 8/2018 | Benn et al. |
| 2018/0360033 A1 | 12/2018 | Naruse et al. |
| 2019/0111618 A1 | 4/2019 | Saito et al. |
| 2019/0176387 A1 | 6/2019 | Kuno et al. |

OTHER PUBLICATIONS

Sigma-Aldrich. "Triethylene Glycol Dimethacrylate T5537.", Apr. 11, 2016, https://web.archive.org/web/20160411054245/https://www.sigmaaldrich.com/catalog/substance/triethyleneglycoldimethacrylate2863210916011?lang=en®ion=US. Retrieved on Sep. 16, 2019]. Retrieved from: https://archive.org/web/ (Year: 2016).*
Stowe, R.W. "UV Q&A: Temperature and UV Curing." UV+EB Technology, Sep. 6, 2017, uvebtech.com/articles/2017/temperature-and-uv-curing/. (Year: 2017).*
Sigma Aldrich. "Triethylene Glycol Dimethacrylate." Sigma Aldrich, Oct. 5, 2017, web.archive.org/web/20171005102507/www.sigmaaldrich.com/catalog/product/sigma/t5537?lang=en®ion=US. (Year: 2017).*
Wikipedia. "Thermal Radiation." Thermal Radiation—Wikipedia, Sep. 24, 2017, web.archive.org/web/20170924133353/en.wikipedia.org/wiki/Thermal_radiation. (Year: 2017).*
Braceland, John. "Market Intelligence for Printing and Publishing." WhatTheyThink, May 7, 2012, whattheythink.com/articles/57763-everything-you-wanted-know-about-uv-lamps/. (Year: 2012).*
Meseguer, José, et al. "Thermal Radiation Heat Transfer." Spacecraft Thermal Control, 2012, pp. 73-86., doi:10.1533/9780857096081.73. (Year: 2012).*
Sigma-Aldrich. Poly(Ethylene Glycol) Dimethacrylate. Apr. 4, 2013, https://www.sigmaaldrich.com/US/en/product/aldrich/907049. (Year: 2013).*
TCI Chemicals. "Polyethylene Glycol Dimethacrylate (N=Approx. 4) (Stabilized with MEHQ)." Polyethylene Glycol Dimethacrylate 25852-47-5 | TCI America, Jun. 3, 2012, https://www.tcichemicals.com/US/en/p/T1352. (Year: 2012).*
Sigma-Aldrich. Poly(Ethylene Glycol) Diacrylate (PEG). Dec. 1, 2016, https://www.sigmaaldrich.com/US/en/substance/polyethyleneglycoldiacrylate1234526570489. (Year: 2016).*
Esterman, M. "Characterization of the Powder/Binder Interaction in the Three Dimensional Printing Process," Submitted to the Department of Mechanical Engineering in Partial Fulfillment of the Requirements for the Degree of Master of Science at the Massachusetts Institute of Technology, (Aug. 24, 1990), 159 pages.
Office Action dated Mar. 26, 2021 received in U.S. Appl. No. 16/243,507, 38 pages.
PubChem 3, N,-[2-[2-[2-[Bis(2-aminoethyl)amino]ethylamino]ethyl-[2-[bis[2-[bis(2-aminoethyl)amino]ethyl]amino]ethyl]imino]ethyl] ethane-1,2-diamine, (Jun. 23, 2018) [retrieved Mar. 10, 2020] retrieved from internet URL: https:// ) pubchem.ncbi .nim.gov/ compound/ 134531463 (Year: 2018), 9 pages.
Vaezi, M., et al., Effects of Layer Thickness and Binder Saturation Level Parameters on 3D Printing Process Int J Adv Manuf Technol (2011) 53:275-284, (Year: 2011).
Gilmer, D., et al., "An in-situ crosslinking binder for binder jet additive manufacturing", Additive Manufacturing (2020), Received Feb. 4, 2020, Received in revised form May 15, 2020, Accepted May 16, 2020, Available online May 25, 2020, pp. 1-11, 35, 101341.

* cited by examiner

INDIRECT ADDITIVE MANUFACTURING PROCESS

This invention was made with government support under Prime Contract No. DE-AC05-00OR22725 awarded by the U.S. Department of Energy. The government has certain rights in the invention.

FIELD OF THE INVENTION

The present invention relates generally to additive manufacturing processes, and more particularly, to indirect (i.e., binder jetting) additive manufacturing processes for constructing a host of three-dimensional objects. The present invention further relates to specific classes and types of crosslinkable or adhesive binders for use in indirect additive manufacturing processes.

BACKGROUND OF THE INVENTION

Additive manufacturing (AM) is a growing technology that has the potential to significantly impact product realization in aerospace, automotive, and medical industries, among others. For some time, AM processes have been largely based on direct powder bed fusion processes, such as selective laser sintering (SLS), selective laser melting (SLM), and electron beam melting (EBM). Although capable, direct fusion processes are hindered by several shortcomings, including thermal stresses within the printed parts, operator burden in completing the build process, and overall cost of the equipment. Furthermore, developing process parameters for new materials in powder bed fusion processing tends to be difficult.

Due to these challenges in direct AM processes, indirect 3D printing (Indirect 3DP) has been increasingly been considered as a more attractive alternative. Indirect 3DP is often integrated with inkjet technology to deposit a binder into a powder bed of metal. The layers of the metal part are adhered together by the binder, one layer at a time to produce an initial "green" version of the object. The "green" part may then be cured in a low temperature oven and then sintered and infiltrated in a high temperature oven. Indirect 3DP can create geometries from a variety of materials without the need for costly direct heat processes, such as lasers or electron beams. By using inkjet printing in the forming process, the layers of the part can be created rapidly and at high resolution.

Indirect-3DP of metals has advantages over powder-bed fusion processes in the areas of cost, processing of new materials, and thermal stresses within the printed parts. First, due to the utilization of inkjet instead of expensive lasers or electron beams during the forming process, the equipment, maintenance, and operation of Indirect 3DP is much less resource-consuming than its SLS, SLM and EBM counterparts. Furthermore, since heat is not used in the forming process, reactive materials that would be hazardous to process via SLM or EBM can be shaped via Indirect 3DP. Finally, since the post-print sintering and infiltration occurs in an oven and at an even distribution throughout the part, residual stresses due to thermal gradients within the part are avoided. Therefore, geometries can be manufactured via Indirect-3DP without the need for post-thermal processing.

Nevertheless, several challenges face Indirect 3DP, including significant production time and overall cost of the process. In particular, the binders used in the art often require a lengthy thermal curing cycle before the printed green part can be handled and de-powdered for sintering. The binder curing step increases the processing time of the finished part, requires additional processing equipment, and increases the overall production cost of the printed part. The reduction or elimination of the thermal curing cycle would dramatically reduce the cost of the printed part, reduce the required equipment, and significantly decrease the processing time to produce the printed part. Moreover, the indirect additive methods of the art often produce cured parts that lack sufficient integrity. The sub-standard mechanical strength of the cured parts often results in breakage or deformation before the part is used or before it is sintered.

SUMMARY OF THE INVENTION

The present disclosure is directed to methods for producing objects of any of a variety of shapes by an indirect additive manufacturing process (also known as a "binder jetting process") in which a binder is used to form an initial preform that may be cured and/or sintered to form a final bonded object. The process disclosed herein represents a significant advance in the art of binder jetting processing at least for the reason that the process produces cured parts with substantial resilience, and does this in the same or less time and cost than that required in conventional binder jetting processes.

By a first methodology, the binder jetting process includes the following steps: (i) separately feeding a powder from which the object is to be manufactured and a difunctional curable monomer into an additive manufacturing device; (ii) dispensing selectively positioned droplets of the difunctional curable monomer, from a printhead of the additive manufacturing device, into a bed of the powder to bind particles of the powder with the difunctional curable monomer to produce a curable preform having a shape of the object to be manufactured; and (iii) curing the curable preform to form a crosslinked object; wherein the difunctional curable monomer (binder) has the following chemical formula:

(1)

wherein $R^1$ and $R^2$ are independently selected from hydrogen and methyl, and x is an integer from 1 to 15.

By a second methodology, the binder jetting process includes the following steps: (i) separately feeding a powder from which the object is to be manufactured and an adhesive polymer into an additive manufacturing device; and (ii) dispensing selectively positioned droplets of the adhesive polymer, from a printhead of the additive manufacturing device, into a bed of the powder to bind particles of the powder with the adhesive polymer (binder) to produce a preform having a shape of the object to be manufactured.

DETAILED DESCRIPTION OF THE INVENTION

The powder used in the binder jetting processes described herein can be composed of any solid material desired as the construction material of the object being produced. The powder can be sinterable or non-sinterable. As well known in the art, a powder is sinterable if it can form a solid cohesive (sintered) mass when subjected to a suitably high temperature without melting the powder. The particles of the powder can have any suitable particle size. The particles can be, for example, nanoparticles (e.g., at least 1, 2, or 5 nm and up to 10, 20, 50, 100, 200, or 500 nm), or microparticles (e.g., 1, 2, or 5 nm and up to 10, 20, 50, 100, 200, or 500 microns), or larger macroscale particles (e.g., at least 1 or 2 mm and up to 4 or 5 mm).

In a first set of embodiments, the powder is at least partly or entirely inorganic in its composition, i.e., the powder has an inorganic composition. The term "inorganic composition," as used herein, corresponds to any composition lacking carbon-hydrogen bonds. The inorganic composition may be, for example, a metal or metal alloy in elemental form, such as iron, titanium, cobalt, nickel, copper, zinc, aluminum, tin, silicon, tantalum, and alloys containing one or more of these elements, e.g., magnetic compositions (e.g., Sm—Co and alnico alloys); carbides, such as iron carbides (steels); and high-strength and/or corrosion-resistant materials (e.g., Ti—Al and Al—Ce alloys and intermetallics). The inorganic composition may alternatively be, for example, a metal oxide, such as an aluminum oxide, gallium oxide, indium oxide, silicon oxide (e.g., glass), germanium oxide, tin oxide, indium tin oxide, yttrium oxide, titanium oxide, zirconium oxide, hafnium oxide, vanadium oxide, niobium oxide, tantalum oxide, chromium oxide, molybdenum oxide, tungsten oxide, manganese oxide, iron oxide ($Fe_2O_3$ or $Fe_3O_4$), cobalt oxide, nickel oxide, copper oxide, zinc oxide, or calcium titanium oxide ($CaTiO_3$). The inorganic composition may alternatively be, for example, a metal nitride, such as boron nitride, silicon nitride, silicon oxynitride, silicon carbide nitride, aluminum nitride, tantalum nitride, or zirconium nitride. The inorganic composition may alternatively be, for example, a metal boride, such as aluminum boride, titanium boride, cobalt boride, tantalum boride, or magnesium boride. In some embodiments, the powder has a ceramic composition, which may be an oxide, carbide, nitride, or boride material, such as any of the compositions exemplified above. In some embodiments, any one or more classes or specific types of inorganic compositions described above may be excluded. In some embodiments, powders having a permanent magnet composition or any magnetic composition are excluded.

In a second set of embodiments, the powder is at least partly or entirely organic in its composition, i.e., the powder has an organic composition. The organic composition generally includes carbon-hydrogen (C—H) groups. Typically, the organic composition is an organic polymer, which may be a thermoplastic or thermoset. The organic polymer may be, for example, a polyolefin (e.g., polyethylene or polypropylene), polystyrene, polyvinyl additional polymer (e.g., PMMA, PVAc, PVA, or PAN), chlorinated polymer (polyvinylchloride), fluorinated polymer (e.g., PVDF or PTFE), polyester, polyamide, polyurethane, polyether sulfone, polycarbonate, phenol-formaldehyde, urea-formaldehyde, polyoxymethylene (polyacetal), polyethyleneimine, polybenzimidazole (PBI), polybenzoxazole, polyether ether ketone (PEEK), polymide, polyamide-imide, polyphenylene sulfide, polyphenylene oxide, polyarylsulfone, and polytetrahydrofuran. In some embodiments, any one or more classes or specific types of organic compositions described above may be excluded.

By a first binder jetting method, a difunctional curable monomer (binder) is used to bind particles of a powder, as described above, in an additive manufacturing device to form a curable preform having a shape of the object to be manufactured, and curing the curable preform to form a crosslinked version of the object. The difunctional curable monomers under consideration herein are within the following generic structural formula:

(1)

In Formula (1) above, $R^1$ and $R^2$ are independently selected from hydrogen and methyl. The subscript x is an integer from 1 to 15. The value of x corresponds to the number of ethyleneoxide groups subtended by x. In different embodiments, x is an integer of precisely 1, 2, 3, 4, 5, 6, 7, 8, 9, 10, 11, 12, 13, 14, or 15, or an integer within a range bounded by any two of the foregoing values, e.g., 1-12, 1-10, 1-8, 1-5, 2-15, 2-12, 2-10, 2-8, 2-5, 3-15, 3-12, 3-10, 3-8, 3-5, 4-15, 4-12, 4-10, 4-8, or 4-6. The above difunctional curable monomers can be synthesized by methods well known in the art, or may in some cases be commercially available.

By a second binder jetting method, an adhesive polymer (binder) is used to bind particles of a powder, as described above, in an additive manufacturing device to form a curable preform having a shape of the object to be manufactured. In some embodiments, the adhesive polymer is not crosslinkable, in which case a curing step is generally not employed on the preform. In other embodiments, the adhesive polymer is crosslinkable, in which case a curing step is generally employed on the preform to cure the preform. The adhesive polymer can be crosslinkable by containing functional groups that can crosslink in response to a crosslinking stimulus, such as heat, high energy electromagnetic radiation (e.g., ultraviolet light), or exposure to air over time. Such crosslinkable functional groups and polymers containing such crosslinking groups are well known in the art, such as generally described in U.S. Pat. No. 7,287,587 and. the contents of which are herein incorporated by reference. The crosslinkable polymer may be, for example, any of the numerous epoxide-containing crosslinkable polymers known in the art; or, for example, any of the formaldehyde-containing polymers, such as a phenol-formaldehyde, formaldehyde-amine, or phenol-formaldehyde-amine polymer, such as described in A. Chernykh et al., *Polymer*, vol. 47, no. 22, pp. 7664-7669, 2006, the contents of which are herein incorporated by reference; or, for example, any of the crosslinkable polymers based on benzocyclobutene, such as described in K. A. Walker et al., *Polymer*, vol. 35, no. 23, pp. 5012-5017; or, for example, any of the vinyl ester resins and unsaturated polyester resins known in the art, such as described in S. Jaswal et al., *Rev. Chem. Eng.*, 30(6), pp. 567-581, 2014.

In one embodiment, the adhesive polymer is a homopolymer. In other embodiments, the adhesive polymer is a copolymer, which may be, for example, a block copolymer, random copolymer, or brush copolymer. Moreover, the term "copolymer," as used herein, refers to the presence of at least two polymer blocks. The copolymer may be, for example, a diblock copolymer, triblock copolymer, tetrablock copolymer, or higher copolymer.

In some embodiments, the adhesive polymer contains metal-binding groups. Some of the metal-binding groups may also function as crosslinking groups, if other groups are available in the polymer to crosslink with such groups. The metal-binding groups may be selected from, for example, carboxylic acid, carboxylic acid ester, amine, amide (carboxamide), and sulfonate groups. Further examples of adhesive polymers are provided below, with the understanding that, in some embodiments, one or more particularly recited polymers may be selected or one or more particularly recited polymers may be excluded.

In a first exemplary embodiment, the adhesive polymer is a cycloamide-containing polymer, such as a pyrrolidinone-containing polymer, or more particularly, a copolymer containing a vinylcycloamide- or vinylpyrrolidinone-containing block and a vinylcarboxylate block.

In a second exemplary embodiment, the adhesive polymer is an amine-containing polymer. An example of such a polymer is a polyethyleneimine polymer, which can have the following structure:

wherein n is as provided above.

In a third exemplary embodiment, the adhesive polymer is a carboxylic acid-containing polymer. The carboxylic acid polymer may be, for example, polymethacrylic acid, polyacrylic acid, polyfumaric acid, polymaleic acid, polysebacic acid, or poly(4-vinylbenzoic acid), or a copolymer containing any of the foregoing as a block. A particular example of such a polymer has the following structure:

where n and m are as provided above.

In a fourth exemplary embodiment, the adhesive polymer is a sulfonate- or sulfonic acid-containing polymer. The sulfonate- or sulfonic acid-containing polymer may be, for example, polystyrene sulfonate, poly(2-acrylamido-2-methyl-1-propanesulfonic acid), naphthalene sulfonic acid (polymer with formaldehyde), and sulfonated tetrafluoroethylenes, such as Nafion®. A further example of such a polymer is poly(vinylsulfonic acid), sodium salt, which has the following structure:

wherein n is as provided above. In the above formula, the $Na^+$ ion may be replaced with another cation, or with a hydrogen atom to provide the sulfonic acid version.

In some embodiments, the difunctional curable monomer of Formula (1) according to the first method, or an adhesive polymer according to the second method, is fed and used in the indirect additive manufacturing device without being admixed with a solvent. In other embodiments, the difunctional curable monomer of Formula (1) according to the first method, or an adhesive polymer according to the second method, is fed and used in the indirect additive manufacturing device as an admixture with a solvent. The term "solvent," as used herein, refers to a liquid in which the monomer of Formula (1) or the adhesive polymer is dissolved or suspended. The solvent may be liquid at room temperature (generally about 20, 22, or 25° C.) or, in the case of a higher melting solvent, the solvent may require heating to turn it into a liquid. The solvent can be any solvent known in the art and which does not interfere with the additive manufacturing process. The solvent may be, for example, a polar protic or aprotic solvent, or an apolar solvent. Some examples of polar protic solvents include water, the alcohols (e.g., methanol, ethanol, n-propanol, isopropanol, and n-butanol), and polyols (e.g., ethylene glycol, propylene glycol, diethylene glycol, triethylene glycol, glycerol, triethanolamine, and N,N,N',N'-tetrakis(2-hydroxyethyl)ethylenediamine). Some examples of polar aprotic solvents include sulfoxide solvents (e.g., dimethyl sulfoxide and ethyl methyl sulfoxide), amide solvents (e.g., N,N-dimethylformamide, N,N-diethylformamide, acetamide, dimethylacetamide, diethylacetamide, gamma-butyrolactam, N-methylpyrrolidone, and hexamethylphosphoramide), ketone solvents (e.g., acetone and 2-butanone), carbonate solvents (e.g., propylene carbonate, ethylene carbonate, butylene carbonate, and dimethyl carbonate), ester solvents (e.g., 1,4-butyrolactone, ethylacetate, ethylpropionate, and propylene glycol methyl ether acetate, i.e., PGMEA), and high-boiling ether solvents (e.g., diethylene glycol dimethyl ether (diglyme), triethylene glycol dimethyl ether (triglyme), tetraethylene glycol dimethyl ether (tetraglyme)). Some examples of apolar solvents include hexanes, heptanes, octanes, benzene, toluene, xylenes, and decalin. In some embodiments, a combination of mutually soluble solvents is used, such as n-propanol and water. In other embodiments, one or more classes or specific types of polymers, as provided above, are excluded. When a solvent is included, the preform is generally subjected to a drying step after the dispensing step to form the preform and before a curing step, if included. The purpose of the drying step is to remove all or substantially all of the solvent from the preform. In some embodiments, any one or more classes or specific types of solvents are excluded.

The binder jetting process is described in detail in, for example, U.S. Application Pub. No. 2015/0069649 and U.S. Pat. No. 6,036,777, the contents of which are herein incorporated by reference in their entirety. In the binder jetting process, a powder, as described above, is fed into an additive manufacturing device (AMF) as a build material. The powder is eventually dispensed as a layer of build material on a vertically movable platform within the additive manufacturing device. The binder, which may be the difunctional curable monomer of Formula (1) or the adhesive polymer, either alone or admixed with a solvent, as described above, are fed into the AMF separately from the powder so that the two components are not in contact when fed into the AMF. The binder is routed to a printhead positioned over the bed of powder. Based on instructions provided by a computer program, as generally provided by a computer-aided manufacturing (CAM) software package, the printhead is directed to dispense selectively positioned droplets of the binder onto the powder bed to form a first layer of the article being built. The printhead can be an ink jet printhead, as well known in the art. Thus, the droplets of the binder can be precisely positioned in various locations on the powder bed to form a first layer of the article being built. As well known in the art of binder jetting, once a first layer of the article is built, the platform holding the powder bed is lowered by an amount equivalent to a layer thickness. A subsequent layer of the object is built by selectively depositing a second set of selectively positioned droplets of the binder. The platform holding the powder bed is then lowered again by another layer thickness, and the process is continued until a preform having the shape of the object to be built is produced. The preform is constructed of particles of the powder bonded together with the binder.

In the case where the difunctional curable monomer is used in the AMF, the preform is subjected to a curing step to cure the curable preform to form a crosslinked object. The curing step subjects the preform to any condition capable of inducing crosslinking of the binder. The curing condition may entail exposure of the preform to, for example, heat, high-energy electromagnetic radiation (e.g., ultraviolet), or chemically reactive substance incorporated into the preform, which works over time and that may be further activated by exposure to heat or electromagnetic radiation (e.g., ultraviolet or x-ray). Generally, when heat is employed, the curing temperature is below the melting point of the binder or powder. In some embodiments, and depending on the chemical composition of the binder and powder, the curing temperature is at least 30° C., 40° C., 50° C., or 60° C. and up to 80° C., 100° C., 120° C., 150° C., 180° C., 200° C., 220° C., or 250° C., or within a range between any two of the foregoing temperatures. In the case where the adhesive polymer is used in the AMF, and where the adhesive polymer is curable (crosslinkable), a curing step may be performed, in which case any of the curing conditions provided above may be employed. In the case where the adhesive polymer is used in the AMF, and where the adhesive polymer is not curable (i.e., not crosslinkable), a curing step is not employed. In the case where the binder is admixed with a solvent, a drying step may be employed before the curing step or as part of the curing step to remove the solvent.

After the curing step, the crosslinked object may or may not be subjected to a sintering step. In the case where a curing step is not used, the preform produced using the adhesive polymer in step (ii) may or may not be subjected to a sintering step. As well known in the art, sintering can be achieved by subjecting the crosslinked or uncrosslinked preform to a suitably elevated temperature, but below the melting point of the powder, at which the particles in the powder become fused. Preferably, for purposes of the invention, the sintering process results in sufficient fusing to result in a robust (i.e., infrangible) object constructed of the powder. Notably, the sintering step is generally not used when the powder is heat-sensitive, as in the case of most magnetic compositions or low-melting compositions. In the sintering process, depending on the conditions and the type of binder used, the binder may either partly or completely volatilize or decompose, or may leave a residue of carbon. The shape of the object being built can include any of the level of detail made possible by binder jetting processes known in the art.

In some embodiments, the invention excludes a binder which is a thermoplastic crosslinkable polymer that has a characteristic of a delayed crosslinking reaction. Such polymers may have the characteristic where it functions initially as a thermoplastic and then as a thermoset after crosslinking. Such polymers, which may or may not be excluded as a binder, may in some cases be considered a hybrid polymer, i.e., having characteristics of both a thermoplastic and a thermoset. At the thermoset stage, such a binder forms a three-dimensional covalent network, and thus, cannot revert back to a thermoplastic state, as expected for a thermoset polymer. In some cases, the hybrid polymer, which may or may not be excluded, is a reactive polymer, such as based on polyurethane and/or epoxy, which may be reacted with rapid or latent crosslinking agents, such as moisture provided by a humid environment in the case of urethanes, or an aromatic amine and a polyphenol in the case of epoxies. The hybrid polymer may be, for example, a polyurethane, epoxy-containing polymer, or polymer containing vinyl acetate units. The hybrid polymer may include a backbone and/or pendant groups that are aromatic, in which case the hybrid polymer may be referred to as an "aromatic polymer". In embodiments of this invention, the polymer material is prepared with a rapid or latent crosslinking agent, such as moisture provided by a humid environment in the case of urethanes, or an aromatic amine and/or a polyphenol in the case of epoxies.

Examples have been set forth below for the purpose of illustration and to describe certain specific embodiments of the invention. However, the scope of this invention is not to be in any way limited by the examples set forth herein.

Examples

Difunctional Curable Monomers

Figure 1:
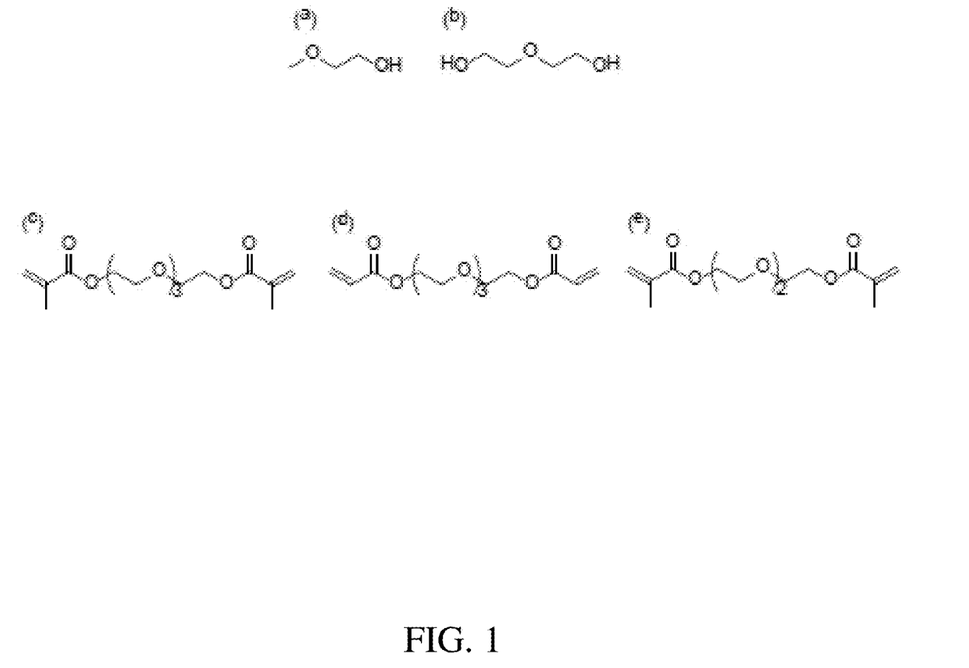
FIG. 1. The structures of some exemplary binders: (a) 2-methoxyethanol, (b) diethylene glycol, (c) tetra(ethylene glycol) dimethacrylate, (d) tetra(ethylene glycol) diacrylate, (e) triethylene glycol dimethacrylate, wherein compounds (a) and (b) are representative of the conventional art and compounds (c)-(e) are representative of the novel binder monomers used in the present invention.

FIG. 1 shows the structures of several binders. Compounds (a) and (b) are commercially used binders, i.e., 2-methoxyethanol and diethylene glycol, respectively (also referred to as BA005 Aqueous Binder). The foregoing commercial binders were found to barely possess an adhesive property. Compounds (c)-(e) are exemplary difunctional binders of the present invention. Compounds (c)-(e) are additionally identified by the following names, respectively: tetra(ethylene glycol) dimethacrylate, tetra(ethylene glycol) diacrylate, and triethylene glycol dimethacrylate. In addition to exhibiting a proper range in viscosity and surface tension, the difunctional binders of the present invention are compatible with metal particles (i.e., they possess the correct wettability range) and are relatively non-toxic. Moreover, the difunctional binders of the present invention form substantially no char upon sintering, in contrast to, for example, polyacrylonitrile or polyimide.

The difunctional monomers disclosed herein are designed to crosslink upon curing, which promotes strong adhesion. These monomers are polymerizable with heat, which makes them auto-polymerizable. The molecular weights of these monomers were selected to be sufficiently high so as to prevent volatilization and minimize toxicity. Commercial binders, such as shown in FIG. 1 (Compounds a and b) are known to be volatile and flammable compounds. Moreover, the major application of triethylene glycol dimethacrylate (FIG. 1 (compound e)) is used as a dental resin material, which implies very low toxicity of these compounds.

Binder Viscosity and Surface Tension

Figure 2:
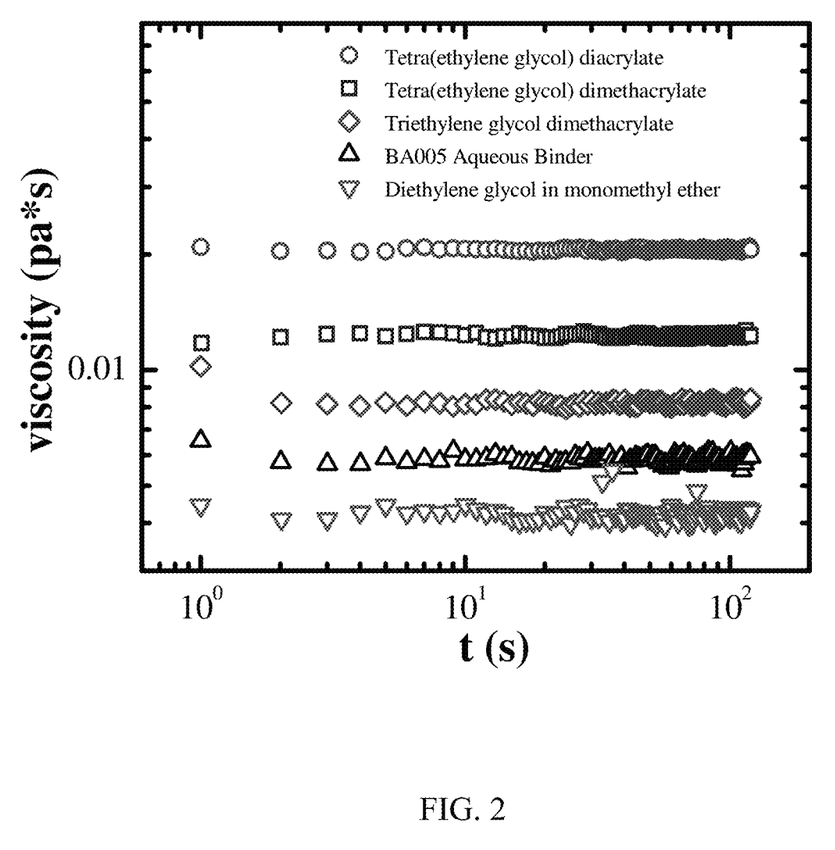
FIG. 2. A graph plotting the viscosity of various binders at room temperature.

Binder Jet 3D printing generally requires a binder at a specific viscosity and surface tension. The viscosity is typically in the range of 20 cP and the surface tension is typically about 20 mN/m. In this experiment, the room temperature viscosity and surface tension of several binders were evaluated. The results are shown in Table 1 (below) and in FIG. 2.

The viscosity measurements were performed at 20° C. at 10 rad/s, 25 mm in diameter Cone-Plate with 2 degree cone and 58 m truncation using AR2000ex (TA instrument). The surface tension was measured by a newly developed custom device and the relative error (conservative) was found to be less than +/−3%. The error for BA005 Aqueous Binder may be larger due to the evaporation of water during the measurement.

The Wilhelmy plate method was used to measure surface tension. The device included the following components: (1) a motorized linear stage connected to a computer, (2) a Wilhelmy plate connected to the stage, which can go up and down, (3) a balance connected to a computer, and (4) a cup with the sample liquid on the balance. By immersing a Wilhelmy plate to the liquid with a known contact position, the total weight on the balance could be measured. The Wilhelmy plate dipper was immersed and lifted until the force no longer changes with time. Linear regression methods were used to estimate the weight difference more precisely. The weight difference was converted to force by the following equation: F [mN]=m[g]×9.8 The force is then divided by the perimeter of the Wilhelmy plate (52/1000) [Meters]. The result is a surface tension in mN/M.

From the data, the viscosity of binders (c)-(e) were observed to be higher than the commercial binders due to their higher molecular weights. Also, the diacrylate compound (d) was found to possess a higher viscosity than methacrylates (c) and (e) because compound (d) can pack better, i.e., with less free volume. Based on the observed viscosity behavior (FIG. 2), the viscosity of these binders should be in the same range of values until 107 rad/s. The obtained surface tensions for all the binders are in a similar range. Although the surface tension of the binders (c)-(e) was found to be slightly higher than the two commercial binders, the value should be in an acceptable range for binder jet printing.

TABLE 1

Room temperature viscosity and surface tension

| Binder | Structure | Viscosity (mPa · s) | Surface tension (mN/M) |
| --- | --- | --- | --- |
| BA005 Aqueous Binder | (structure) | 5.9 | ~27 |
| Diethylene glycol in monomethyl ether | (structure) | 4.2 | 32 |
| Tetra(ethylene glycol) dimethacrylate, FIG. 1 (c) | (structure) | 12.3 | 37 |
| Tetra(ethylene glycol) diacrylate, FIG. 1 (d) | (structure) | 20.5 | 36 |
| Triethylene glycol dimethacrylate, FIG. 1 (e) | (structure) | 8.2 | 37 |

Fabrication of Cured Metal Parts: Investigation of Curing Methods and Conditions In these experiments, various curing tests of these novel binders ((c) tetra(ethylene glycol) dimethacrylate, (d) tetra(ethylene glycol) diacrylate, (e) triethylene glycol dimethacrylate) in addition to conventional binders were conducted. Also, the methods and test protocols were developed to accurately access the properties. The initial calculation of the binder amount follows.

Binder: powder ratio is (voidspace times saturation)= (0.4×0.8)=0.32

Density of stainless steel particles (SS420) is 7.74 g/cm^3

Density times ~60% packing factor=4.6 g/cm3

1 cm³ of SS420 needs ~0.32 mL binder 1 mL binder requires ~3 mL powder or ~14 grams.

Although the above formulation (1 mL binder with 14 g SS420 particles) works well for the conventional binders (a) and (b), the novel binders (c)-(e) imparted excessive wetness when they were used in the above binder amount. For purposes of the invention, a lower binder amount of 0.75 ml was found to be preferable when using the novel binders (c)-(e).

After several trials, it was found that Teflon molds with a rectangular shape were most suited for producing samples. The binder (c-e)/SS420 mixtures were placed in an oven at 100° C. for 1, 3, or 6 hours or 200° C. for 2 hours. The curing kinetics control the formation of solid cured samples. The time and temperature were varied to determine the optimum curing conditions for achieving the desired mechanical properties. As shown in Table 2 (below), several curing conditions produced a very hard solid bar, which demonstrates the capability of these novel binders.

TABLE 2

Results of curing tests for binders (c)-(e)

| Binder Name | Curing Temperature (° C.) | Curing Time (hours) | Description |
| --- | --- | --- | --- |
| Tetraethylene glycol dimethacrylate | 100 | 1 | The bar was completely soft and crumbled after being taken out of the mold. |
| Tetraethylene glycol dimethacrylate | 100 | 3 | Mostly retained its shape around the edges and bottom, while very soft in the center and the top. |
| Tetraethylene glycol dimethacrylate | 100 | 6 | The bar was soft at the edges, crumbling to the touch, but solid in the middle. It was still fragile and able to be bent in the middle. |
| Tetraethylene glycol dimethacrylate | 200 | 2 | The bar was completely solid all the way through. There was some discoloration. |
| Tetraethylene glycol diacrylate | 100 | 1 | The bar fell apart after being taken out of the mold and was completely soft and crumbly. |
| Tetraethylene glycol diacrylate | 100 | 3 | The bar was completely soft and crumbled after being taken out of the mold. |
| Tetraethylene glycol diacrylate | 100 | 6 | The bar was completely soft and crumbled after being taken out of the mold. |
| Tetraethylene glycol diacrylate | 200 | 2 | The bar was solid all the way through, but cracked in the middle. This result may be due to the curing method or to expansion during curing. |
| Triethylene glycol dimethacrylate | 100 | 1 | The bar fell apart after being taken out of the mold and was completely soft. |
| Triethylene glycol dimethacrylate | 100 | 3 | The bar fell apart after being taken out of the mold and was completely soft. |
| Triethylene glycol dimethacrylate | 100 | 6 | The bar was completely solid all the way through. |
| Triethylene glycol dimethacrylate | 200 | 2 | The bar was completely solid with significant discoloration on the sides and bottom. |

While there have been shown and described what are at present considered the preferred embodiments of the invention, those skilled in the art may make various changes and modifications which remain within the scope of the invention defined by the appended claims.

What is claimed is:

1. A method for indirect additive manufacturing of an object, the method comprising:
   (i) separately feeding a powder from which said object is to be manufactured and a liquid admixture consisting of a difunctional curable monomer and a solvent into an additive manufacturing device;
   (ii) dispensing selectively positioned droplets of said liquid admixture, from a printhead of said additive manufacturing device, into a bed of said powder to bind particles of said powder with said difunctional curable monomer to produce a curable preform having a shape of the object to be manufactured; and
   (iii) curing said curable preform to form a crosslinked object, wherein said curing is achieved solely by heating the curable preform without exposure to high-energy electromagnetic radiation to a curing temperature of 150-220° C.;
   wherein said difunctional curable monomer has the following chemical formula:

(1)

wherein $R^1$ and $R^2$ are independently selected from hydrogen and methyl, and x is an integer from 1 to 15.

2. The method of claim 1, further comprising (iv) sintering said crosslinked object to fuse said particles of the powder to produce a robust object constructed of said powder.

3. The method of claim 1, wherein x is an integer from 1-10.

4. The method of claim 1, wherein x is an integer from 2-15.

5. The method of claim 1, wherein x is an integer from 2-10.

6. The method of claim 1, wherein x is an integer from 3-15.

7. The method of claim 1, wherein x is an integer from 3-10.

8. The method of claim 1, wherein said difunctional curable monomer is admixed with a solvent.

9. The method of claim 1, wherein said powder is sinterable.

10. The method of claim 1, wherein said powder has a composition comprising a metal in elemental form or a metal oxide.

11. The method of claim 1, wherein said curing is achieved by subjecting the curable preform to a curing temperature of 180-220° C.

12. The method of claim 1, wherein said curing is achieved solely by heating the curable preform, without exposure to ultraviolet radiation, to a curing temperature of 150-220° C.

13. The method of claim 1, wherein said curing is achieved solely by heating the curable preform in an oven to a curing temperature of 150-220° C.

14. The method of claim 1, wherein x is 4.

* * * * *